(12) United States Patent
Haskins

(10) Patent No.: US 6,907,723 B1
(45) Date of Patent: Jun. 21, 2005

(54) PULSED TURBINE ROTOR ENGINE

(76) Inventor: David Haskins, 7155 Wedgewood Dr., Jacksonville, FL (US) 32244

( * ) Notice: Subject to any disclaimer, the term of this patent is extended or adjusted under 35 U.S.C. 154(b) by 54 days.

(21) Appl. No.: 10/683,032

(22) Filed: Oct. 10, 2003

(51) Int. Cl.[7] .............................................. F02C 3/16
(52) U.S. Cl. ................................................ 60/39.34
(58) Field of Search ........................... 60/39.34, 36.76, 60/39.78

(56) References Cited

U.S. PATENT DOCUMENTS

| | | | |
|---|---|---|---|
| 903,657 A | 11/1908 | Beckmann | |
| 2,486,990 A | 11/1949 | Sharpe | |
| 3,089,307 A | * 5/1963 | Kollander | 60/39.34 |
| 3,375,657 A | 4/1968 | Sherwood et al. | |
| 4,590,761 A | * 5/1986 | Zettner | 60/39.34 |
| 4,807,440 A | 2/1989 | Salem | |
| 5,138,831 A | * 8/1992 | Cowan, Sr. | 60/39.34 |
| 5,660,038 A | 8/1997 | Stone | |
| 5,709,088 A | 1/1998 | Acaster | |

* cited by examiner

Primary Examiner—Ehud Gartenberg
(74) Attorney, Agent, or Firm—Michael R. Schacht; Schacht Law Office, Inc.

(57) ABSTRACT

A pulsed turbine rotary engine comprising a fixed section, an output shaft, a plurality of nozzle openings, an air supply system, a fuel supply system, and an ignition system. The fixed section defines a plurality of intake openings each defining an intake axis. The output shaft is supported by the fixed section for rotation about a shaft axis. The nozzle housings are operatively connected to the output shaft for rotation about the shaft axis. Each nozzle housing defines a nozzle chamber in fluid communication with a nozzle inlet and a nozzle outlet defining a thrust axis. The air and fuel supply systems direct air and fuel through the intake openings. The ignition system comprises spark plugs for igniting fuel within the nozzle chambers.

26 Claims, 5 Drawing Sheets

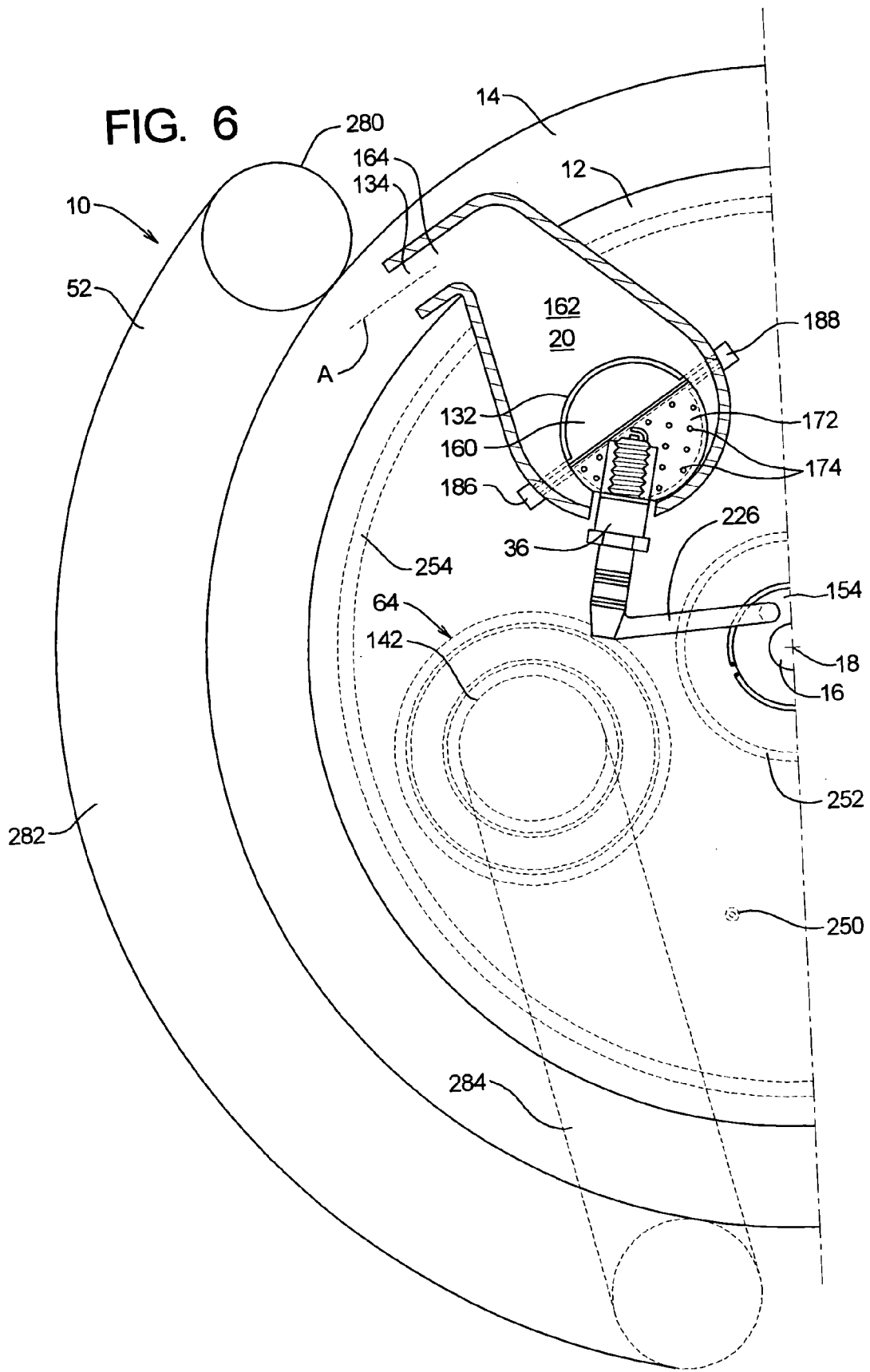

PULSED TURBINE ROTOR ENGINE

BACKGROUND OF THE INVENTION

1. Technical Field

The present invention relates to engines for rotating an output shaft and, in particular, to rotary engines that convert the thrust of expanding gasses into rotation of an output shaft.

2. Technical Background

The present invention relates to rotary engines that employ reaction forces from expanding exhaust gasses to rotate a rotor section. A professional patentability search conducted on behalf of the Applicant turned up the following U.S. Patents relating to such rotary engines:

U.S. Pat. No. 5,660,038 to Stone discloses a rotary jet engine in which a housing chamber is divided into intake and exhaust zones. Intake portions of combustion jets extend into the intake zone, while exhaust portions of the combustion jets extend into the exhaust zone.

U.S. Pat. No. 2,486,990 to Sharpe discloses a jet propulsion motor in which air/fuel intake pipes rotate with a rotor section on which a plurality of nozzles are supported.

U.S. Pat. No. 5,709,088 to Acaster discloses a rotary engine in which a reciprocating piston is supported within a compression chamber defined by a stator section. A rotor section rotates around the stator section and defines induction, compression, and exhaust sections that communicate in succession with the combustion chamber.

U.S. Pat. No. 4,807,440 discloses an internal combustion rotary engine in which expanding exhaust gasses in a fixed housing are directed across a rotor within the housing.

U.S. Pat. No. 3,375,657 discloses a rotary gas turbine engine comprising a fixed ring defining combustion chambers. A plurality of rotating members are supported by a shaft for rotation within the fixed ring.

U.S. Pat. No. 903,657 to Beckmann discloses a turbine engine in which expanding exhaust gasses from a fixed explosion chamber drive a rotor.

The need exists for inexpensive, fuel efficient and responsive rotary engines that rotate an output shaft in reaction to expanding exhaust gasses.

SUMMARY OF THE INVENTION

The present invention may be embodied as a pulsed turbine rotary engine comprising a fixed section, an output shaft, a plurality of nozzle openings, an air supply system, a fuel supply system, and an ignition system. The fixed section defines a plurality of intake openings each defining an intake axis. The output shaft is supported by the fixed section for rotation about a shaft axis. The nozzle housings are operatively connected to the output shaft for rotation about the shaft axis. Each nozzle housing defines a nozzle chamber in fluid communication with a nozzle inlet and a nozzle outlet defining a thrust axis. The air and fuel supply systems direct air and fuel through the intake openings. The ignition system comprises spark plugs for igniting fuel within the nozzle chambers.

In use, the nozzle inlets substantially align with each intake opening once during each rotation of the nozzle housings. The intake system and fuel system direct air and fuel into the nozzle chambers through the aligned intake openings and nozzle inlets. The ignition system ignites the fuel and air within the nozzle chambers to create expanding exhaust gasses that exit the nozzle chambers through the nozzle outlets. The nozzle axes are configured such that the nozzle housings and output shaft rotate about the shaft axis relative to the fixed section in reaction to movement of the expanding exhaust gasses through the nozzle outlets.

BRIEF DESCRIPTION OF THE DRAWINGS

FIG. 6 is an enlarged axial section view depicting one side of the embodiment of the engine system of the present invention as depicted in FIG. 3.

DETAILED DESCRIPTION OF THE INVENTION

Figure 1:
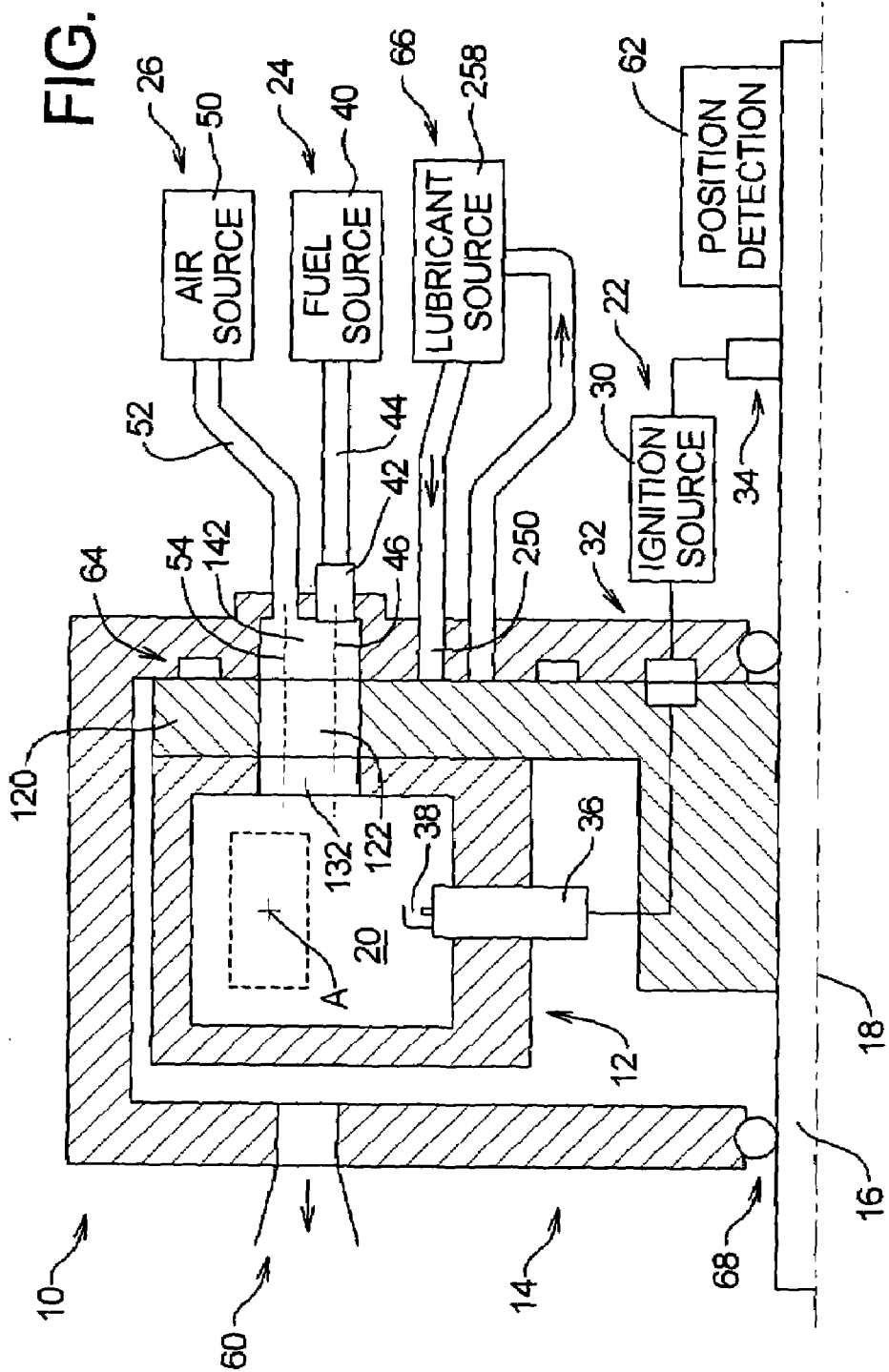
FIG. 1 is a highly schematic longitudinal section view depicting major components of a pulsed turbine rotor engine of the present invention.

Referring initially to FIG. 1 of the drawing, depicted therein is a pulse turbine rotor system 10 constructed in accordance with, and embodying, the principles of the present invention. The engine system 10 comprises a rotor section 12, a fixed section 14, and an output shaft 16 defining a shaft axis 18.

The fixed section 14 rotatably supports the output shaft 16. The rotor section 12 is secured to the output shaft 16 such that the rotation of the rotor section 12 about the shaft axis 18 causes rotation of the output shaft 16 about the shaft axis 18. The rotor section 12 may further be rotatably supported in part by the fixed section 14.

The engine system 10 further comprises a nozzle chamber 20, an ignition system 22, a fuel supply system 24, and an air supply system 26. The nozzle chamber 20 is rigidly connected to the rotor section 12. The fuel supply system 24 and air supply system 26 inject fuel and air, respectively, into the nozzle chamber 20. The ignition system 22 ignites the fuel air mixture within the nozzle chamber 20. Expanding exhaust gases resulting from the ignition of the air/fuel mixture are directed out of the nozzle chamber 20 along a thrust axis A.

The rotor section 12 rotates in reaction to the expanding gases directed out of the nozzle chamber 20 to cause the output shaft 16 to rotate about the shaft axis 18. Repeating the ignition process in a controlled manner causes continuous rotation of the output shaft 16. The output shaft 16 may be used to drive a load (not shown) in a conventional manner.

To optimize torque on the output shaft 16, the thrust axis A is preferably substantially tangential to a circle centered on the shaft axis 18. In addition, a minimum of two nozzle chambers 20 are provided with thrust axes in opposing directions such that the reaction forces applied to the output shaft 16 through the rotor section 12 are substantially balanced.

FIG. 1 shows that the ignition system 22 comprises an ignition source 30, a distributor system 32, a grounding system 34, and a spark plug 36 associated with each of the nozzle chambers 20. The ignition source 30 and spark plugs 36 are or may be conventional. The distributor system 32 and grounding system 34 create an electrical path between the ignition source 30 and the spark plugs 36. When connected to the spark plugs 36 by the distributor and grounding systems 32 and 34, the ignition source 30 generates a spark across spark gaps 38 defined by each of the spark plugs 36. The spark across the spark gaps 38 ignites the air/fuel mixture within the nozzle chambers 20. The timing of the ignition process will be described in further detail below.

The fuel supply system 24 comprises a fuel source 40, a plurality of fuel injectors 42, and fuel hoses 44 connecting the fuel injectors 42 to the fuel source 40. The fuel injectors 42 are supported by the fixed section 14 to direct discrete quantities of fuel into the nozzle chambers 20. The fuel injectors 42 are preferably electronically controlled, and the timing of the fuel injection process may be timed to correspond with the ignition process. The timing of the fuel supply system 24 will also be described in further detail below.

FIG. 1 further illustrates that the air supply system 26 comprises an air source 50 and a plurality of intake pipes 52 supported by the fixed section 14. The air source 50 comprises a compressor forms a supply of pressurized air. Each of the intake pipes 52 is connected at one end to the air source and at another end to the fixed section 14. As will be described in further detail below, the intake pipes 52 each direct pressurized air along an intake axis 54. Further, as the rotor section 12 rotates relative to the fixed section 14, the intake pipes 52 are placed in fluid communication with the nozzle chambers 20 such that air flows along the intake axes 54 into the nozzle chambers 20.

FIG. 1 further illustrates that the exemplary engine system 10 further comprises an exhaust system 60, a position detection system 62, a seal system 64, a lubrication system 66, and a bearing system 68. The exhaust system 60 provides a path along which exhaust gases resulting from the combustion of the air/fuel mixture will pass when exiting the engine system 10. The position detection system 62 is optional and may be used to detect an angular position of the output shaft 16; the angular position of the output shaft 16 may be represented by a position signal POS that may be used to time the ignition system 22 and fuel supply system 24. The lubrication system 66 is configured to reduce wear between the rotor section 12 and fixed section 14. The bearing system 68 is configured to reduce friction at the points where the output shaft 16 and/or rotor section 12 are supported by the fixed section 14. Each of these systems 60–68 will be described in further detail below.

Figure 2:
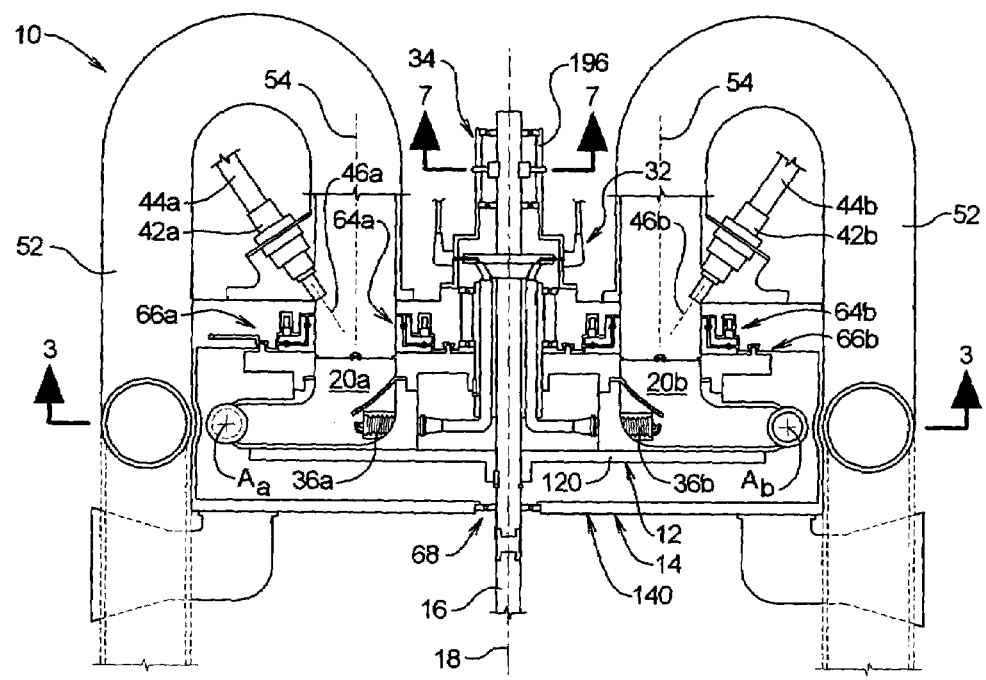
FIG. 2 is longitudinal section view of one embodiment of an engine system of the present invention.

With the foregoing basic understanding of the operation of the engine system 10, the construction and operational details of this system 10 will now be described. Referring initially to FIG. 2, that figure illustrates that the exemplary system 10 comprises first and second nozzle chambers 20a and 20b and associated first and second spark plugs 36a and 36b, first and second fuel injectors 42a and 42b, and first and second intake pipes 52a and 52b.

Figure 3:
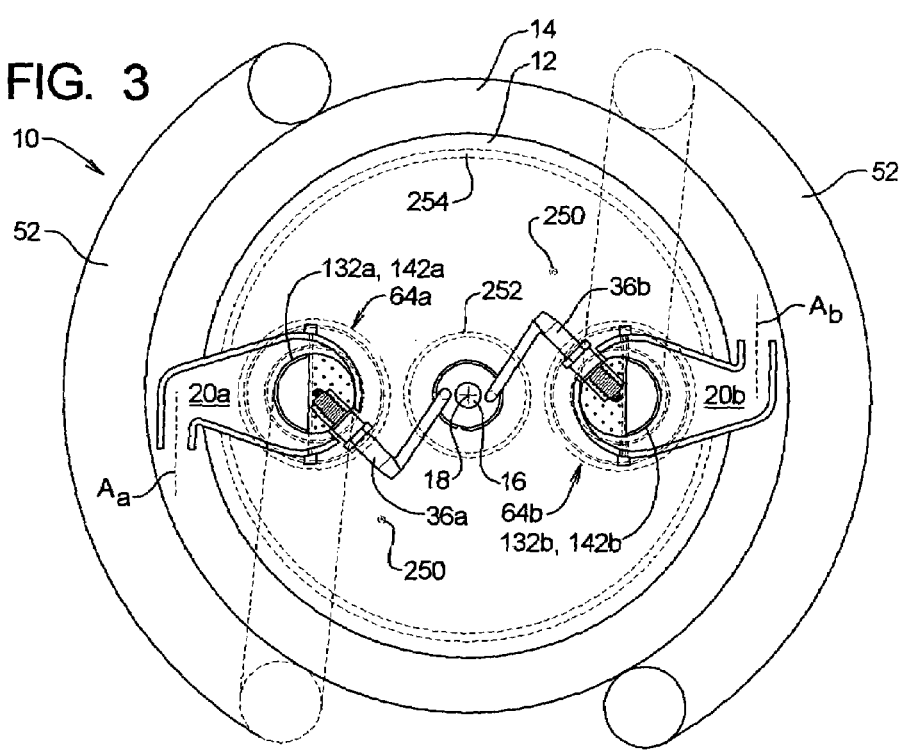
FIGS. 3 and 4 are axial section view of the engine system of FIG. 2 taken along lines 3—3 in FIG. 2 and illustrating the engine system in first and second operational states.
Figure 4:
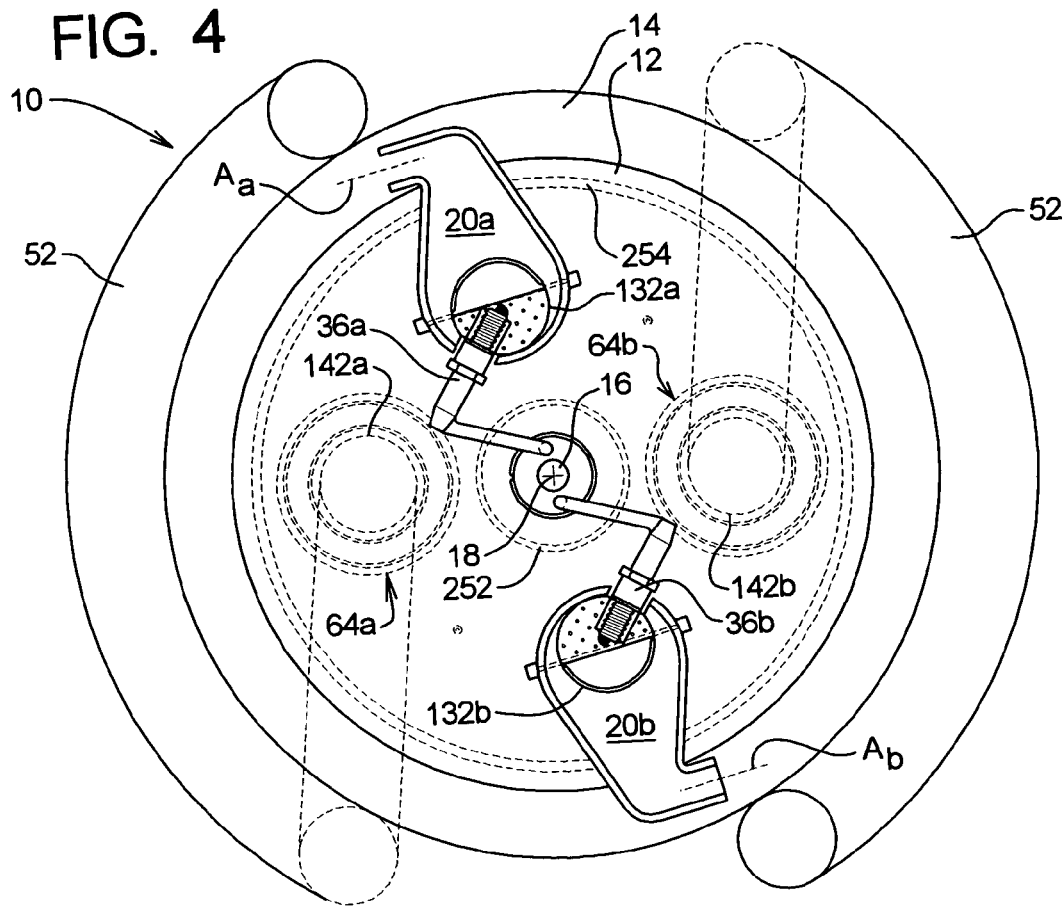

FIGS. 2, 3, and 4 illustrate relevant states of the exemplary engine system 10 as the system 10 moves through its combustion cycle. In particular, as the rotor section 12 rotates relative to the fixed section 14 about the shaft axis 18, the injector axes 46a,b and intake axes 54a,b each intersect each of the nozzle chambers 20a,b once during each revolution. The engine system 10 will be in what is referred to as an intake/compression portion of the combustion cycle when the axes 46a,b and 54a,b intersect the chambers 20a,b.

In particular, the exemplary engine system 10 operates as follows. The combustion cycle begins when the injector and intake axes 46a and 54a intersect or are aligned with the nozzle chamber 20a. At the same time, the injector and intake axes 46b and 54b intersect or are aligned with the nozzle chamber 20b. During this initial intake/compression portion of the combustion cycle, compressed air flows into the nozzle chambers 20a,b through the intake pipes 52a,b, and the fuel injectors 42a,b are operated to inject fuel into the nozzle chambers 20a,b.

As the rotor section 12 continues to rotate relative to the fixed section 14, the injector axes 46a,b and intake axes 54a,b no longer intersect the nozzle chambers 20a,b as shown in FIG. 4. At this point, the engine system 10 is in what will be referred to as the ignition/thrust portion of the combustion cycle. At the beginning of the first ignition/thrust portion of the combustion cycle, the nozzle chambers 20a,b contain a mixture of fuel and pressurized air. The spark plugs 36a,b are then fired to ignite the air/fuel mixture; the air/fuel mixture thus combusts to form expanding exhaust gasses. The expanding exhaust gasses are released from the nozzle chambers 20a,b along the thrust axis A to form thrust that rotates the rotor section 12 about the shaft axis 18 relative to the fixed section 14. Because the rotor section 12 is attached to the output shaft 16, the output shaft 16 also rotates about the shaft axis as described above.

The rotor section 12 continues to rotate until the injector and intake axes 46a and 54a intersect or are aligned with the nozzle chamber 20b and the injector and intake axes 46b and 54b intersect or are aligned with the nozzle chamber 20a. The engine system 10 enters a second intake/compression portion of the combustion cycle in which another batch of air/fuel mixture is introduced into each of the chambers 20a,b. As the rotor section 12 continues to rotate, the engine system 10 enters a second ignition/thrust portion of the combustion cycle during which the air/fuel mixture within the chambers 20a,b is ignited to create additional thrust for rotating the rotor section 12.

With proper timing of the fuel injectors 42a,b and spark plugs 36a,b, the rotation forces created in reaction to fluid flow out of the chambers 20a,b will be balanced. In addition, the amount of air/fuel mixture introduced into the chambers 20a,b will determine the strength and duration of the thrust applied to the rotor section 12. The duration and strength of the thrust will determine the power applied to the output shaft 16. The physical size of the various components and rotational speed of the rotor section will also determine the maximum thrust strength and maximum thrust duration. The basic principles described with reference to the exemplary engine system 10 also apply to an engine system of the present invention with sets of three, four, or more nozzle chambers.

Figure 5:
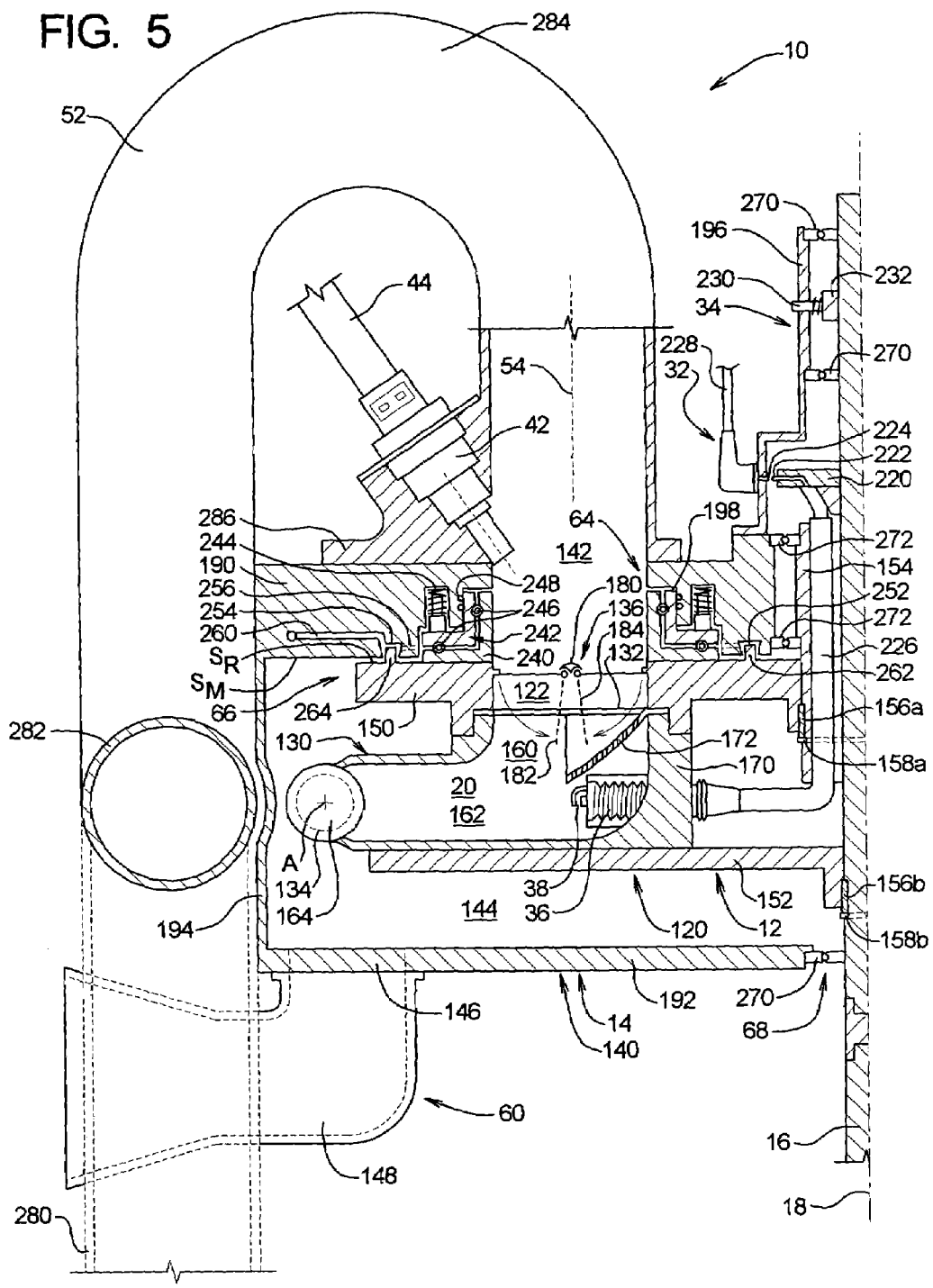
FIG. 5 is an enlarged longitudinal section view depicting one side of the embodiment of the engine system of the present invention as depicted in FIG. 2.

Referring now to FIGS. 2–6, the ignition system 22, fuel supply system 24, air supply system 26, exhaust system 60, seal system 64, lubrication system 66, and bearing system 68 will be described in further detail. As described above, the exemplary engine system 10 comprises two nozzle chambers 20a,b. Certain components of the ignition system 22, fuel supply system 24, air supply system 26, and seal system 64 are replicated for each of the nozzle chambers 20a,b. In FIGS. 5 and 6 and portions of the following discussion, only one set of these replicated components will be described in detail, with the understanding that the replicated components are typically (but not necessarily) identical.

FIG. 5 illustrates that the rotor section 12 comprises a rotor housing 120 defining a plurality of rotor openings 122. The rotor housing 120 supports a plurality of nozzle housing assemblies 130, where each nozzle housing assembly 130 is associated with one of the rotor openings 122. The nozzle housing assemblies 130 each define one of the nozzle chambers 20 and further define a nozzle inlet 132. The nozzle inlets 132 are arranged to allow fluid communication between one of the rotor openings 122 and the nozzle chamber 20 associated therewith.

As shown in FIGS. 5 and 6, the housing assemblies 130 each further define a nozzle outlet 134 through which exhaust gasses exit the nozzle chambers 20. The nozzle outlets 134 each define one of the thrust axes A. The thrust axes A are located a second fixed distance from the shaft axis 18.

The exemplary rotor openings 122 and nozzle inlets 132 are round openings that are aligned with each other. The rotor openings 122 and nozzle inlets 132 are arranged such that they are located a first fixed distance from the shaft axis 18. The exemplary rotor openings 122 and nozzle inlets 132 are equally spaced about the shaft axis 18; in the exemplary engine system 10 having two nozzle chambers 20a,b, the pairs of rotor openings 122 and nozzle inlets 132 are spaced approximately 180° from each other.

As perhaps best shown in FIG. 5, each nozzle housing assembly further defines a check valve assembly 136 located within the nozzle chambers 20 adjacent to each nozzle inlet 132. The check valve assemblies 136 allow fluid flow into the nozzle chambers 20 through the nozzle inlets 132 but prevent fluids from flowing out of the nozzle chambers 20 through the nozzle inlets 132.

FIGS. 2 and 5 show that the fixed section 14 comprises a manifold housing assembly 140 defining a plurality of intake openings 142, an exhaust chamber 144, and exhaust ports 146. The exhaust system 60 is represented by exhaust pipes 148 in the drawing.

As perhaps best shown in FIG. 5, the rotor housing 120 is formed by a rotor faceplate 150, a rotor wall 152, and a spark plug cable coupler sleeve 154. The rotor faceplate 150 defines a rotor surface $S_R$.

First and second key members 156a and 156b secure the rotor housing 120 to the output shaft 16. First and second retaining rings 158a and 158b hold the key members 156a and 156b, respectively, in place.

Each of the intake openings 142 is a round opening having the same cross-sectional area as the rotor openings 122 described above. The intake openings 142 are located the first fixed distance from the shaft axis 18 and are equally spaced about the shaft axis 18; in the exemplary engine system 10 having two nozzle chambers 20a,b, the intake openings 142 are spaced approximately 180° from each other. Accordingly, the intake openings 142 align with the pairs of rotor openings 122 and nozzle inlets 132 once during each revolution of the rotor section 12 relative to the fixed section 14.

FIGS. 5 and 6 illustrate that each nozzle chamber 20 comprises an inner portion 160, a central portion 162, and an outer portion 164. The inner portions 160 define the nozzle inlets 132, while the outer portions 164 define the nozzle outlets 134. The central portions 162 of the nozzle chambers 20 extend in a generally radial direction from the shaft axis 18 between the inner portions 160 and outer portions 164.

FIGS. 5 and 6 also show that each nozzle housing assembly 130 comprises an inner wall 170 in which the spark plugs 36 are supported. A deflector shield 172 extends from the inner wall 170 at a location adjacent to the nozzle inlets 132 toward the central portion 162 of the nozzle chambers 20. The inner walls 170 are threaded to receive the spark plugs 36 with electrodes defining the spark gaps 38 being positioned to ignite the air/fuel mixture entering the nozzle chambers 20.

Each deflection shield 172 defines perforations 174 and is arranged between the fuel injectors 42 and the spark plugs 36 to deflect most of the air and fuel into the nozzle chambers 20. The perforations 174 allow a portion of the air/fuel mixture to reach the spark plug gap 38. The deflection shields 172 maintain a relatively low pressure area around the spark plug electrodes to promote combustion and reduce flameout. The shields 172 further help reduce the amount of outwardly traveling flame from combustion that goes back into the intake pipes 52.

FIG. 5 illustrates that the check valve assembly 136 comprises a valve door support 180 supported by the nozzle housing assembly 130 and first and second valve doors 182 and 184 rotatably attached to the valve door support 180. The valve doors 182 and 184 open and close such that the valve assembly 136 is in closed and open configurations. In particular, as shown in FIG. 6, the valve door support 180 comprises spring assemblies 186 and 188. The exemplary spring assemblies 186 and 188 are helical springs configured to bias the doors 182 and 184 such that the valve assembly 136 is normally in its closed position configuration.

Accordingly, the valve assembly 136 is in its closed configuration when the pressures on both sides of the valve assembly 136 are equal and when the pressure within the nozzle chamber 20 exceeds the pressure within the intake pipes 52. The valve assembly 136 is in its open configuration when the pressure within the intake pipes 52 is greater than the pressure within the nozzle chamber 20 and the force of the spring assemblies 186 and 188.

FIG. 5 further illustrates that the manifold housing assembly 140 comprises a manifold faceplate 190, an exhaust shroud 192, an annular outer wall 194, and a distributor cap 196. A seal recess 198 is formed in the faceplate 190. The faceplate 190 defines a manifold surface $S_M$. As perhaps best shown in FIGS. 2 and 5, the manifold housing assembly 140 supports the rotor housing assembly 120 such that the rotor surface $S_R$ is substantially parallel with and closely adjacent to the manifold surface $S_M$.

FIG. 5 also illustrates details of the exemplary distributor system 32 used by the engine system 10. The distributor system 32 comprises a distributor rotor 220 that is secured to the spark plug cable coupler sleeve 154 such that the rotor 220 rotates with the output shaft 16. A plurality of rotor contacts 222 are supported by the distributor rotor 220. A plurality of fixed contacts 224 are supported by the distributor cap 196. A spark plug cable 226 extends between each of the rotor contacts 222 and an associated one of the sparks plugs 36. An ignition cable 228 extends between each of the fixed contacts 224 and the ignition source 30. The contacts 222 and 224 are electrically isolated from each other by, for example, making the rotor 220 and cap 196 out of non-conductive materials.

Figure 7:
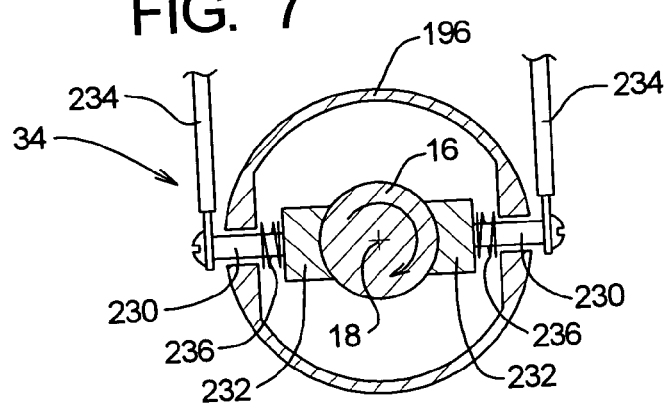
FIG. 7 is an enlarged axial section view taken along lines 7—7 in FIG. 2.

The grounding system 34 is configured to complete the electrical circuit to the ignition source 30 through the spark plugs 36. As shown in FIG. 7, one or more grounding posts 230 are supported by the distributor cap 196. The grounding contact 232 is in turn supported by each of the grounding posts 230. The grounding cables 234 extend between each of the grounding posts 230 and the ignition source 30. Grounding springs 236 are configured to bias the grounding contacts 232 against the output shaft 16.

As described above, the spark plugs 36 are supported by the inner wall 170 of the nozzle housing assembly 130 and the nozzle housing assembly 130 is supported by the rotor housing assembly 120. The rotor housing assembly 120 is in turn supported by the spark plug cable coupler sleeve 154, which is in turn in contact with and supported by the output shaft 16.

The distributor rotor 220 and distributor cap 196 are arranged such that, as the output shaft 16 rotates, each of the rotor contacts 222 comes into an ignition position relative to each of the fixed contacts 224 during one revolution of the output shaft 16. When the rotor contacts 222 are in the ignition position and the ignition source generates a high voltage signal, the grounding contacts 232, grounding posts 230, and grounding cables 234 complete an electrical circuit from the spark plugs 36 to the ignition source 30.

Optimally, the high voltage signals carried by the ignition system 22 are generated and distributed simultaneously for proper engine functioning. Slight differences in resistance values for each ignition circuit may cause minute differences in the time it takes each spark plug 36 to generate a spark across the spark gaps 38; the effects of different resistance values can be minimized by making the distributor components (cables, etc.) as electrically identical as possible.

As shown in FIG. 5, the seal system 64 comprises, for each of the intake openings 142, a rotary seal member 240, a seal piston member 242, one or more seal springs 244, one or more seal bearings 246, and a plurality of O-rings 248. The seal recesses 198 described above are generally L-shaped cavities in the manifold surfaces $S_M$ that extend around each of the intake openings 142 defined by the manifold housing assembly 140. One rotary seal member 240 and one seal piston member 242 is arranged within each of the seal recesses 198. Accordingly, the number of intake openings 142 defines the number of rotary seal members 240.

The seal springs 244 bias the rotary seal member 240 against the rotor surface $S_R$ to substantially prevent fluid flow through the gap between the manifold surface $S_M$ and the rotor surface $S_R$ during operation of the engine system 10. The seal bearings 246 allow rotation of the seal members 240 relative to the piston members 242 when the rotor faceplate 150 rotates relative to the manifold faceplate 190. The seal bearings 246 should have non-conductive tracks or housings to prevent electrical arcing across the bearings 246 under shorted conditions. The O-rings 248 inhibit fluid flow behind the seal piston members 242.

The seal system 64 directs compressed air and fuel into the nozzle chambers 20 during the intake/compression portions of the combustion cycle. During the ignition/thrust portions of the combustion cycle, the seal system 64 forms shut-off valve that, in conjunction with the check valve assembly 136, ensures that exhaust gasses flow out of the nozzle outlets 134 and not between the faceplates 150 and 190.

As shown in FIGS. 3, 4, and 6, the lubrication system 66 comprises one or more lubricant ports 250, first and second lubricant channels 252 and 254, a lubricant passage 256, a lubricant source 258 (FIG. 1), and a lubricant drain 260. The lubricant ports 250, lubricant channels 252 and 254, lubricant passage 256, and lubricant drain 260 are formed in the manifold faceplate 190. First and second lubricant deflectors 262 and 264 extend from the rotor surface $S_R$ of the rotor faceplate 150 into the first and second lubricant channels 252 and 254, respectively.

As perhaps best shown in FIGS. 3 and 4, the lubricant channels 252 and 254 and lubricant deflectors 262 and 264 are annular and centered about the shaft axis 18. The intake openings 142 are arranged radially between the lubricant channels 252 and 254. The lubricant ports 250 are also arranged radially between the lubricant channels 252 and 254 and are angularly spaced between the intake openings 142.

The lubricant ports 250 allow lubricant to flow from a lubricant source 258 to the space between the manifold surface $S_M$ and the rotor surface $S_R$. Centrifugal forces will cause the lubricant to spread out over the surfaces $S_M$ and $S_R$. The lubricant lubricates the surfaces $S_M$ and $S_R$ and the seal members 240 to reduce wear on the faceplates 150 and 190 and the seal members 240. The lubricant on the surfaces $S_M$ and $S_R$ is eventually deflected by the deflectors 262 and 264 into the channels 252 and 254. The lubricant passage 256 allows lubricant to flow from the second lubricant channel 254 into the first lubricant channel 252. The first lubricant channel 252 is connected to the lubricant drain 260, which returns the lubricant to the lubricant source 258 for reuse.

FIGS. 2 and 5 illustrate the bearing system 68 in further detail. The bearing system 68 comprises a plurality of main bearing assemblies 270 and a plurality of secondary bearing assemblies 272. The main bearing assemblies 270 are arranged to rotatably support the output shaft 16 on manifold housing assembly 140 of the fixed section 14. As described above, the spark plug cable coupler sleeve 154 is rigidly connected to the output shaft 16. The secondary bearing assemblies 272 are arranged to support the coupler sleeve 154 (and thus the output shaft 16) on the manifold housing assembly 140. The bearing assemblies 270 and 272 should have non-conductive housings to inhibit electrical arcing across the bearing assemblies 270 and 272. Similarly, special non-conductive couplings should be used to transmit rotary torque from the power to shaft to the accessories or load.

As shown somewhat schematically in FIGS. 5 and 6, the intake pipes 54 comprise an outer portion 280 connected to the air source 50, a heat exchange portion 282, and a flange portion 284 connected to an intake flange 286 of the manifold faceplate 190. The fuel injectors 42 are supported by the intake flanges 286. The heat exchange portion 282 takes the form of a curved pipe portion that extends around at least a portion of the exhaust shroud 192. The heat of exhaust gasses contained by the exhaust shroud is transferred to the air within the heat exchange portion 282 of the intake pipes 54. The air forced into the nozzle chambers 20 is thus preheated.

The combination of the power shaft 16 and the spark plug cable coupler sleeve 154 provide a centralized rotary ignition network. The power shaft 16 and coupler sleeve 154 may be two separate pieces locket together as shown or may be formed by a single part. The spark plug cables 226 extend through channels formed in the coupler sleeve 154.

The power shaft 16 may be used to power components of the engine system 10. For example, the air source 50 may be formed by a compressor that obtains power from the power shaft 16. In this respect, rotation of the power shaft 16 as detected by the position detection system 62 may be used to initiate timing sequences used by the ignition and fuel supply systems 22 and 24.

The ignition source 30 may be any suitable device for developing a high voltage ignition signal for operating the spark plugs 36. Suitable devices include high energy ignition coils, magnetos, or transformer/capacitor networks. One ignition source 30 is typically provided for each spark plug 36. A timing system (not shown) controls these ignition sources 30 to operate in unison. The timing system may include the position detection system 62 as generally described above.

The timing system may further control the fuel injectors 42 of the fuel supply system 24. The primary throttle mechanism of the engine system 10 is by varying the amount of fuel injected by the fuel injectors 42.

Initial start-up of the engine system 10 would be by a separate starter motor (not shown) attached to the output shaft 16. The starter motor rotates the shaft until adequate thrust can be established for the engine system 10 to operate on its own.

The pulsed turbine rotor engine system 10 is most efficient at full power when all nozzle chambers 20 are supplied with fuel and air and ignited at the same time at full throttle settings. The system 10 will operate at lower power by, for example, reducing the amount of fuel supplied and/or introducing fuel into and igniting the fuel in only a portion of the nozzle chambers.

I claim:

1. A pulsed turbine rotary engine comprising:
    a fixed section defining an exhaust chamber and a plurality of intake openings each defining an intake axis;
    an output shaft supported by the fixed section for rotation about a shaft axis;
    a plurality of nozzle housings operatively connected to the output shaft for rotation about the shaft axis through a combustion cycle, where
        each nozzle housing defines a nozzle chamber in fluid communication with a nozzle inlet and a nozzle outlet, and
        each nozzle outlet defines a thrust axis, the nozzle outlets are in continuous fluid communication with the exhaust chamber during the combustion cycle;
    an air supply system supported by the fixed section for directing air through the intake openings;
    a fuel supply system supported by the fixed section for directing fuel through the intake openings; and
    an ignition system comprising spark plugs supported by the nozzle housings for igniting fuel within the nozzle chambers; wherein
    the nozzle inlets substantially align with each intake opening once during each rotation of the nozzle housings;
    the intake system and fuel system direct air and fuel into the nozzle chambers through the aligned intake openings and nozzle inlets;
    the ignition system ignites the fuel and air within the nozzle chambers to create expanding exhaust gasses that exit the nozzle chambers through the nozzle outlets; and
    the nozzle thrust axes are configured such that the nozzle housings and output shaft rotate about the shaft axis relative to the fixed section in reaction to movement of the expanding exhaust gasses through the nozzle outlets.

2. A pulsed turbine rotary engine as recited in claim 1, further comprising a rotor housing supported by the output shaft for rotation about the shaft axis relative to the fixed section, where the rotor housing supports the plurality of nozzle housings and defines a plurality of rotor openings in fluid communication with the plurality of nozzle inlets.

3. A pulsed turbine rotary engine as recited in claim 2, in which the rotor housing comprises a rotor faceplate supported by the output shaft for rotation about the shaft axis relative to the fixed section, where the rotor openings are formed in the rotor faceplate.

4. A pulsed turbine rotary engine as recited in claim 2, in which the rotor housing comprises a coupler sleeve supported by the output shaft for rotation about the shaft axis relative to the fixed section.

5. A pulsed turbine rotary engine as recited in claim 2, in which the rotor housing comprises a rotor wall supported by the output shaft for rotation about the shaft axis relative to the fixed section.

6. A pulsed turbine rotary engine as recited in claim 2, in which the rotor housing comprises:
    a coupler sleeve supported by the output shaft for rotation about the shaft axis relative to the fixed section;
    a rotor faceplate secured to the coupler shaft for rotation about the shaft axis relative to the fixed section, where the rotor faceplate defines a plurality of rotor openings; and
    a rotor wall supported by the output shaft for rotation about the shaft axis relative to the fixed section; whereby
    the nozzle housings are supported by the rotor faceplate and rotor wall such that each of the rotor openings is in fluid communication with one of the nozzle intakes.

7. A pulsed turbine rotary engine as recited in claim 1, in which the ignition system comprises:
    an ignition source;
    a distributor system operatively connected between the ignition source and the spark plugs; and
    a grounding system operatively connected between the spark plugs and the ignition source.

8. A pulsed turbine rotary engine as recited in claim 7, in which the distributor system comprises:
    a distributor cap secured to the fixed section;
    a plurality of cable contacts operatively connected to the ignition source, where the cable contacts are supported by the distributor cap;
    a rotor secured to the output shaft; and
    a plurality of rotor contacts operatively connected to the spark plugs, where the spark plugs are supported by the rotor; whereby
    electrical energy may be transmitted from the cable contacts to the rotor contacts when the rotor contacts are substantially aligned with the cable contacts.

9. A pulsed turbine rotary engine as recited in claim 7, in which the grounding system comprises:
    at least one grounding element operatively connected to the ignition source; and
    a spring for forcing the grounding element against the output shaft.

10. A pulsed turbine rotary engine as recited in claim 8, in which the grounding system comprises:
    at least one grounding element operatively connected to the ignition source, where the at least one grounding element is supported by the distributor cap; and
    a spring arranged between the grounding element and the distributor cap for forcing the grounding element against the output shaft.

11. A pulsed turbine rotary engine as recited in claim 1, in which each nozzle chamber comprises:
    an inner portion in fluid communication with the nozzle inlet;
    an outer portion in fluid communication with the nozzle outlet; and
    a central portion for allowing fluid flow between the inner portion and the outer portion; wherein
    the intake axis extends through the inner portion and is substantially parallel to the shaft axis;

the central portion extends generally radially from the shaft axis; and the outlet axis extends through the outer portion and is substantially orthogonal to the shaft axis.

12. A pulsed turbine rotary engine as recited in claim 1, in which each nozzle housing further comprises a check valve assembly arranged to inhibit flow of expanding exhaust gasses from the nozzle chambers into the intake openings.

13. A pulsed turbine rotary engine as recited in claim 1, in which each nozzle housing further comprises a deflection shield arranged to direct flow of a portion of the fluid entering the nozzle chamber through the nozzle inlet towards the nozzle outlet.

14. A pulsed turbine rotary engine as recited in claim 1, in which the fuel supply system comprises:
a supply of fuel;
a plurality of fuel injectors supported by the fixed section; wherein
each fuel injector is operatively connected to the supply of fuel and arranged to inject fuel through an associated one of the intake openings.

15. A pulsed turbine rotary engine as recited in claim 1, in which the air supply system comprises:
a supply of pressurized air; and
a plurality of intake pipes, where each intake pipe defines
a compressor portion operatively connected to the supply of pressurized air;
an intake portion operatively connected to the one of the intake openings in the fixed portion; and
a heat exchange portion for allowing flow of pressurized air from the compressor portion to the intake portion; whereby
the heat exchange portion is arranged such that at least a portion of the heat energy of the exhaust gasses is transferred to the pressurized air flowing through the intake pipe.

16. A pulsed turbine rotary engine as recited in claim 1, in which the fixed section comprises a fixed faceplate in which the intake openings are formed, the engine further comprising:
a rotor faceplate supported by the output shaft for rotation about the shaft axis relative to the fixed section, where the rotor faceplate defines a rotor opening for each nozzle housing, and
the rotor openings are in fluid communication with the nozzle inlets; and
a seal system arranged to inhibit fluid flow between the fixed faceplate and the rotor faceplate around the intake openings.

17. A pulsed turbine rotary engine as recited in claim 16, in which the seal system comprises:
a seal groove formed in the fixed faceplate around each of the intake openings;
a seal member received in each of the seal grooves around each of the intake openings; and
a seal spring received in each of the seal grooves to bias the seal members out of the seal grooves against the rotor faceplate.

18. A pulsed turbine rotary engine as recited in claim 1, in which the fixed section comprises a fixed faceplate in which the intake openings are formed, the engine further comprising:
a rotor faceplate supported by the output shaft for rotation about the shaft axis relative to the fixed section, where the rotor faceplate defines a rotor opening for each nozzle housing, and the rotor openings are in fluid communication with the nozzle inlets; and
a lubrication system arranged to inject lubricant between the fixed faceplate and the rotor faceplate.

19. A pulsed turbine rotary engine as recited in claim 18, in which the lubrication system comprises:
first and second lubrication channels formed in the fixed faceplate;
first and second lubricant deflectors extending from the rotor faceplate into the first and second lubrication channels, respectively;
a lubrication port formed in the fixed faceplate through which lubricant is injected; and
a lubricant collection system for collecting lubricant within the first and second lubrication channels; whereby
the lubrication port is arranged in a lubrication portion of the fixed faceplate between the first and second lubrication channels.

20. A pulsed turbine rotary engine comprising:
a fixed section defining a plurality of intake openings each defining an intake axis;
an output shaft supported by the fixed section for rotation about a shaft axis;
a rotor housing supported by the output shaft for rotation about the shaft axis relative to the fixed section, where the rotor housing defines a plurality of rotor openings;
a plurality of nozzle housings supported by the rotor housing for rotation about the shaft axis, where
each nozzle housing comprises a check valve assembly;
each nozzle housing comprises a deflection shield;
each nozzle housing defines a nozzle chamber in fluid communication with a nozzle inlet and a nozzle outlet,
each nozzle outlet defines a thrust axis,
each nozzle inlet is in fluid communication with one of the rotor openings,
the intake axis extends through the inner portion and is substantially parallel to the shaft axis, and
the outlet axis extends through the outer portion and is substantially orthogonal to the shaft axis;
an air supply system supported by the fixed section for directing air through the intake openings;
a plurality of fuel injectors supported by the fixed section and arranged to inject fuel through an associated one of the intake openings; and
an ignition system comprising
an ignition source,
spark plugs supported by the nozzle housings,
a distributor system operatively connected between the ignition source and the spark plugs, and
a grounding system operatively connected between the spark plugs and the ignition source, where
the ignition source operates the spark plugs through the distributor system and grounding system to ignite fuel within the nozzle chambers; wherein
the deflection shields are arranged to direct flow of a portion of the fluid entering the nozzle chambers through the nozzle inlets towards the nozzle outlets;
the check valve assemblies are arranged to inhibit flow of expanding exhaust gasses from the nozzle chambers into the intake openings;
the nozzle inlets substantially align with each intake opening once during each rotation of the nozzle housings;

the intake system and fuel system direct air and fuel into the nozzle chambers through the aligned intake openings and nozzle inlets;

the ignition system ignites the fuel and air within the nozzle chambers to create expanding exhaust gasses that exit the nozzle chambers through the nozzle outlets; and the nozzle axes are configured such that the nozzle housings and output shaft rotate about the shaft axis relative to the fixed section in reaction to movement of the expanding exhaust gasses through the nozzle outlets.

21. A pulsed turbine rotary engine as recited in claim 20, in which the rotor housing comprises:

a coupler sleeve supported by the output shaft for rotation about the shaft axis relative to the fixed section;

a rotor faceplate secured to the coupler shaft for rotation about the shaft axis relative to the fixed section, where the rotor openings are formed in the rotor faceplate; and a rotor wall supported by the output shaft for rotation about the shaft axis relative to the fixed section; whereby the nozzle housings are supported by the rotor faceplate and rotor wall.

22. A pulsed turbine rotary engine as recited in claim 20, in which the air supply system comprises:

a supply of pressurized air; and a plurality of intake pipes, where each intake pipe defines a compressor portion operatively connected to the supply of pressurized air;

an intake portion operatively connected to the one of the intake openings in the fixed portion; and a heat exchange portion for allowing flow of pressurized air from the compressor portion to the intake portion; whereby the heat exchange portion is arranged such that at least a portion of the heat energy of the exhaust gasses is transferred to the pressurized air flowing through the intake pipe.

23. A pulsed turbine rotary engine as recited in claim 20, in which the fixed section comprises a fixed faceplate in which the intake openings are formed, the engine further comprising:

a rotor faceplate supported by the output shaft for rotation about the shaft axis relative to the fixed section, where the rotor faceplate defines a rotor opening for each nozzle housing, and the rotor openings are in fluid communication with the nozzle inlets; and a seal system arranged to inhibit fluid flow between the fixed faceplate and the rotor faceplate around the intake openings.

24. A pulsed turbine rotary engine as recited in claim 23, in which the seal system comprises:

a seal groove formed in the fixed faceplate around each of the intake openings;

a seal member received in each of the seal grooves around each of the intake openings; and a seal spring received in each of the seal grooves to bias the seal members out of the seal grooves against the rotor faceplate.

25. A pulsed turbine rotary engine as recited in claim 20, in which the fixed section comprises a fixed faceplate in which the intake openings are formed, the engine further comprising:

a rotor faceplate supported by the output shaft for rotation about the shaft axis relative to the fixed section, where the rotor faceplate defines a rotor opening for each nozzle housing, and the rotor openings are in fluid communication with the nozzle inlets; and a lubrication system arranged to inject lubricant between the fixed faceplate and the rotor faceplate.

26. A pulsed turbine rotary engine as recited in claim 25, in which the lubrication system comprises:

first and second lubrication channels formed in the fixed faceplate;

first and second lubricant deflectors extending from the rotor faceplate into the first and second lubrication channels, respectively;

a lubrication port formed in the fixed faceplate through which lubricant is injected; and a lubricant collection system for collecting lubricant within the first and second lubrication channels; whereby the lubrication port is arranged in a lubrication portion of the fixed faceplate between the first and second lubrication channels.

\* \* \* \* \*